(12) United States Patent
Maston

(10) Patent No.: US 8,785,856 B2
(45) Date of Patent: Jul. 22, 2014

(54) INFRARED TEMPERATURE MEASUREMENT AND STABILIZATION THEREOF

(75) Inventor: Robert A. Maston, Columbus, OH (US)

(73) Assignee: CVG Management Corporation, New Albany, OH (US)

(*) Notice: Subject to any disclaimer, the term of this patent is extended or adjusted under 35 U.S.C. 154(b) by 101 days.

(21) Appl. No.: 13/178,077

(22) Filed: Jul. 7, 2011

(65) Prior Publication Data

US 2012/0006989 A1    Jan. 12, 2012

Related U.S. Application Data

(60) Provisional application No. 61/362,623, filed on Jul. 8, 2010.

(51) Int. Cl.
*G01N 25/72* (2006.01)
*G01J 5/02* (2006.01)

(52) U.S. Cl.
USPC ........................................ 250/340; 374/121

(58) Field of Classification Search
USPC ........................................ 250/340; 374/121
See application file for complete search history.

(56) References Cited

U.S. PATENT DOCUMENTS

| | | | |
|---|---|---|---|
| 5,877,500 A * | 3/1999 | Braig et al. .................... | 250/353 |
| 5,969,639 A | 10/1999 | Lauf et al. | |
| 6,057,549 A * | 5/2000 | Castleman ............... | 250/339.15 |
| 7,378,294 B2 * | 5/2008 | Ding et al. ...................... | 438/51 |
| 2006/0149143 A1 | 7/2006 | Colvin, Jr. | |
| 2008/0224817 A1 | 9/2008 | Vellore et al. | |
| 2009/0120104 A1 | 5/2009 | Federer | |
| 2009/0296775 A1 | 12/2009 | Yamaguchi | |

OTHER PUBLICATIONS

Lee W. Young, Notification of Transmittal of the International Search Report and the Written Opinion of the International Searching Authority, or the Declaration, Nov. 15, 2011.

* cited by examiner

*Primary Examiner* — David Porta
*Assistant Examiner* — Kenneth J Malkowski
(74) *Attorney, Agent, or Firm* — Kegler Brown Hill & Ritter; James J. Pingor

(57) ABSTRACT

Infrared (IR) temperature measurement and stabilization systems, and methods related thereto are provided. The innovation actively stabilizes temperatures of objects in proximity and within the path between an infrared (IR) sensor and target object. A temperature monitor and controller are employed to regulate power to resistive temperature devices (RTDs) thereby regulating current (and power) to the RTDs. As a result, temperatures of IR visible objects can be actively stabilized for changes, for example, changes in ambient temperatures, resulting in efficient and accurate temperature readings.

20 Claims, 16 Drawing Sheets

INFRARED TEMPERATURE MEASUREMENT AND STABILIZATION THEREOF

CROSS-REFERENCE TO RELATED APPLICATIONS

This application claims the benefit of U.S. Provisional Patent application Ser. No. 61/362,623 entitled "INFRARED TEMPERATURE MEASUREMENT AND STABILIZATION THEREOF" and filed Jul. 8, 2010. The entirety of the above-noted application is incorporated by reference herein.

BACKGROUND

Infrared (IR) temperature sensors can monitor infrared light which is then converted into an electrical signal and ultimately to a temperature reading. The spectrum of infrared radiation cannot be readily seen by humans without the use of specially designed equipment that makes the spectrum visible. Measurement of infrared waves is calibrated in microns, ranging from 0.7 to 1000 microns. Today, infrared temperature sensors can be used to measure temperature of almost any type of moving part or object, including many used related to vehicles.

One of the most basic IR temperature sensor designs consists of a lens that focuses IR energy onto to a detector. The detector can convert the measured energy to an electrical signal, which can be displayed in units of temperature. An object's emissivity is used together with the captured energy in order to convert measured energy into temperature. Today, more sophisticated sensors can passively compensate for ambient temperature variations so as to effect accurate measurement of a target object.

One very useful feature of IR sensors is the ability to measure temperatures, e.g., without physical contact. This temperature monitoring ability is especially useful in situations where objects are in motion, e.g., in vehicular applications. Unfortunately, environmental effects upon the sensor require protective housings and the like to be installed to protect the sensors from environmental elements. Protective housings and the like include materials that vary in temperature and contribute to the IR energy path of the sensor thereby making accurate and efficient temperature measurements difficult.

With regard to conventional IR temperature sensors, significant measurement errors often occur when the IR sensor, e.g., thermopile, is subject to thermal conditions such as a wide range in operating temperatures, temperature rate of change, or static thermal gradients in the sensing region or path. Any IR visible object in the path between the sensing component and the measurement target will both deliver energy to the sensor as well as block a portion of the thermal energy emitted by object target; resulting in accurate and inefficient temperature measurement.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises infrared (IR) temperature measurement and stabilization systems, and methods related thereto. The innovation actively stabilizes temperatures of objects in the path between an IR sensor and target object. A temperature monitor and controller is employed to regulate power to resistive temperature devices (RTDs) thereby regulating current (and power) to the RTDs. As a result, temperatures of IR visible objects can be actively stabilized for changes, for example, changes in ambient temperatures.

With regard to traditional infrared (IR) temperature sensors, significant measurement errors often occur when the IR sensor, e.g., thermopile, is subject to thermal conditions such as a wide range in operating temperature, temperature rate of change, or static thermal gradients in the sensing region. IR visible objects in the path between the sensing component and the measurement target will both deliver energy to the sensor as well as block a portion of the thermal energy emitted by object target. In accordance with the innovation, intermediate media, such as optical lens and protective window, are held thermally stable thereby allowing their energy contributions to be known and precisely compensated for by the measurement system. As well, other components in the sensing region can be stabilized via RTDs, e.g., sensor housing, baseplate, etc.

Accordingly, the innovation can deliver a final temperature indication response time that is significantly reduced by actively stabilizing the key measurement components. Temperature compensation, including both sensor steady-state temperature and rate of change dependencies, can be significantly reduced or eliminated by actively stabilizing the key measurement components by way of RTDs together with temperature control components and circuitry.

In other aspects, the innovation passively stabilizes temperatures of objects in the path between a sensor and target object. In these aspects passive thermal stabilization is accomplished via conductively coupling the sensor to optics.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
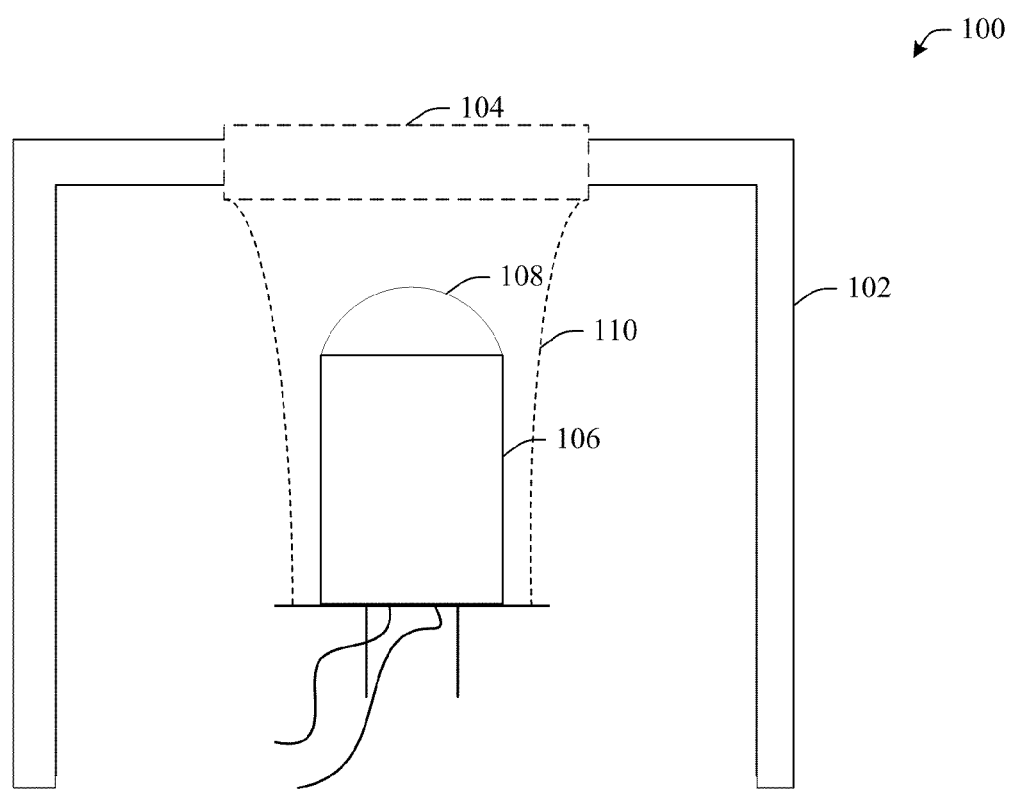
FIG. 1 illustrates an example infrared (IR) temperature sensor system capable of component stabilization in accordance with aspects of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As will be described in greater detail infra, the innovation discloses stabilization of critical measurement components as well as other 'visible' objects in an infrared (IR) temperature measurement system. The innovation can effectively stabilize interference caused by a protective cap or housing as well as other IR 'visible' components in close proximity to the IR sensor. As will be understood, IR thermal measurement is highly susceptible to the thermal energy state and flux of both the sensing element and IR 'visible' media in (and around) the target-object path. Active stabilization of the thermal energy or absolute temperature of these system components is one underlying principal of this disclosure. This temperature stabilization enhances accuracy and can be performed at an efficient rate as compared to conventional IR sensor systems.

Referring initially to the drawings, FIG. 1 illustrates an example IR temperature sensor system 100 capable of active component temperature stabilization. Generally, the system 100 can include a protective housing 102 (e.g., molded plastic cap) having an integral window or lens 104. It will be appreciated that the lens 104 (e.g., transparent window) enables measurement of IR energy via IR temperature sensor 106 (e.g., thermopile). It will be appreciated that this window can be manufactured of the same material as the protective housing 102. Thus, variations in temperature of the window 104 effects accuracy of IR measurements until its temperature is stabilized. It will be appreciated that the window 104 can often represent 30 to 50% of the energy detected by thermopile 106. For at least this reason, the innovation is capable of stabilizing the temperature of the window 104 such that compensation can efficiently and effectively be made to enhance accuracy of the sensing device 106. As shown, the temperature sensor 106 is equipped with optics 108, which can also vary in temperature and effect performance of the thermopile 106.

Because the temperature of the window 104 fluctuates often during operation, a heat source is provided to stabilize its temperature thereby increasing performance of the IR temperature monitoring functionality. Additionally, because the window 104 is most often manufactured of plastic, fluctuations in temperature are slow as plastic is not an efficient conductor of heat. An example conductive metal frame equipped with resistive temperature devices (RTDs) will be described in greater below. This conductive metal is deposited on the inner side of the protective housing 102 and can focus heat upon the window 104. It is to be understood and appreciated that other aspects can include an optional temperature directional means (e.g., cone-like device) that captures heat from a conductive source equipped with RTDs and channels that heat to the window 104 and components of the sensor 106. In other words, in some aspects and environments, the heating effects and efficiency as described herein can be affected by the low conductivity of the captive air within the protective housing. By providing a temperature channeling means, e.g., funnel, (illustrated as dashed lines 110), heat can be contained within the inner area of the cone, thereby enhancing stabilization effects.

It will be appreciated that measurement system errors of several degrees exists under current or traditional measurement techniques. Laborious, time consuming and expensive calibration processes are required to compensate over varying temperature ranges. Other techniques have been attempted to passively control temperature of intermediate media using insulating and conducting materials. Unfortunately, these techniques are complicated and result in delayed temperature readings. Further, passive control of intermediate media temperatures oftentimes results in error or inaccurate readings. It will be appreciated many applications require high accuracy in IR temperature measurements. The active temperature stabilization systems of the subject innovation can provide this accuracy.

Traditionally, intrinsic errors in IR temperature measurements were tolerated. Additionally, the optical lens or raw sensor was protected from environmental elements by looking through narrow chambers or long tubes. Still further, in accordance with traditional systems, environmentally protective barriers were removed as they led to complexity that resulted in inaccurate readings. Devices took a long time in temperature stable environments to indicate accurately.

In accordance with traditional systems, temperature compensation is currently handled by collecting sensor responses over a wide range of temperatures. Thereafter, the indication is adjusted using sensor unique correction factors. This is both time consuming and leads to compromised accuracy. Large thermal masses are added to slow temperature rates of change and to resolve thermal gradients. Unfortunately, this approach leads to enhanced device size and longer thermal response times.

The measurement system 100 of FIG. 1 can actively control the thermal environment of key components of the IR measurement system. Following is a review of options available to stabilize temperatures. One technique of the sensor systems allows the sensor 106 to come into thermal equilibrium shortly after the environment temperature and heat sources stabilize. To accomplish this, the thermopile sensor 106 is exposed directly to the environment with little or no protection from corrosive or harsh environments. This direct exposure is needed in order for its temperature to track the environmental temperature in a reasonable amount of time. Unfortunately, direct exposure results in damage and corrosive elements upon the sensor.

Another alternative technique employs thermal separation of heat sources, such as power dissipating electronic components, while enhancing passive thermal conduction between a protective cover and environmental media heat transfer. It will be understood that traditional products have limited performance over wide ambient temperature range.

Overall, the IR system 100 of FIG. 1 can offer improved accuracy in view of conventional systems by way of active temperature stabilization. Additionally, more accurate temperatures can be rendered in a faster response time. The system 100 employs simplification that results in reduced time related to the calibration process. Overall end cost can be reduced in view of the efficiencies offered by the features, functions and benefits of the innovation. Still further, the sensor 106 and system 100 can have a wider application base. Thus, the innovation provides a versatile system adaptable to a wide range of uses or applications.

Figure 2:
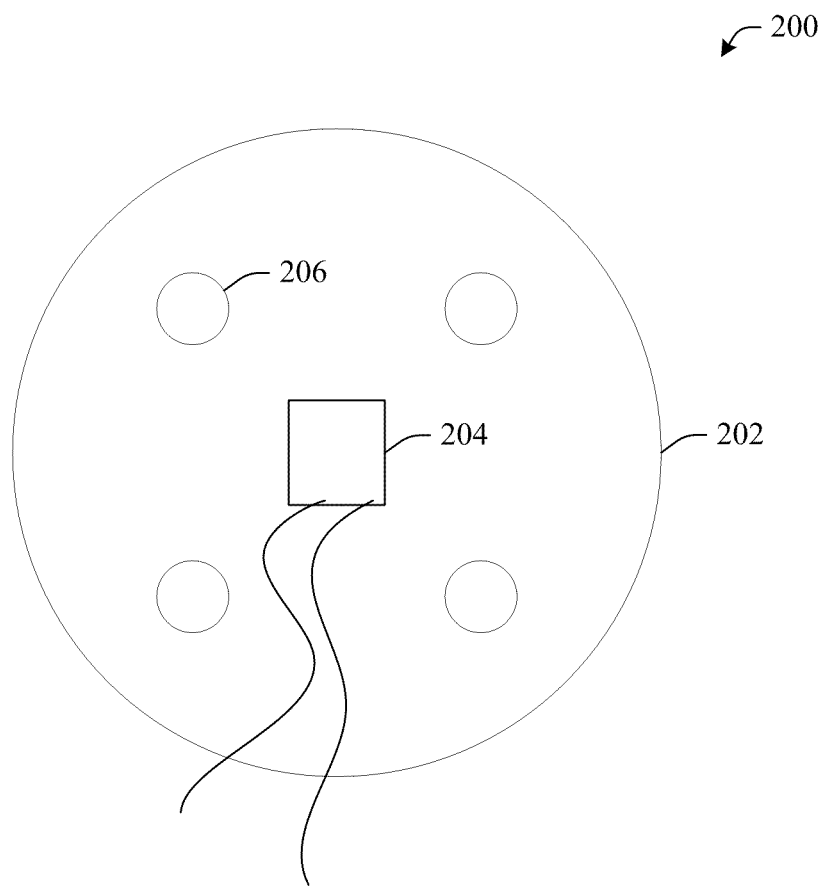
FIG. 2 illustrates an example bottom view of a self-heating temperature sensor system in accordance with aspects of the innovation.

Turning now to FIG. 2, a bottom view of an example self-heating temperature sensor 200 is shown. Item 202 is illustrative of a baseplate of the thermopile of FIG. 1. An RTD 204 capable of detecting and generating heat can be thermally bonded to the baseplate 202. Accordingly, in addition to detecting thermal power, RTD 204 can also generate heat thereby stabilizing the temperature of the baseplate 202, along with other components of the system. Lead apertures 206 are shown and provide means by which thermopile leads can traverse the baseplate 202 to accompanying circuitry.

Figure 3:
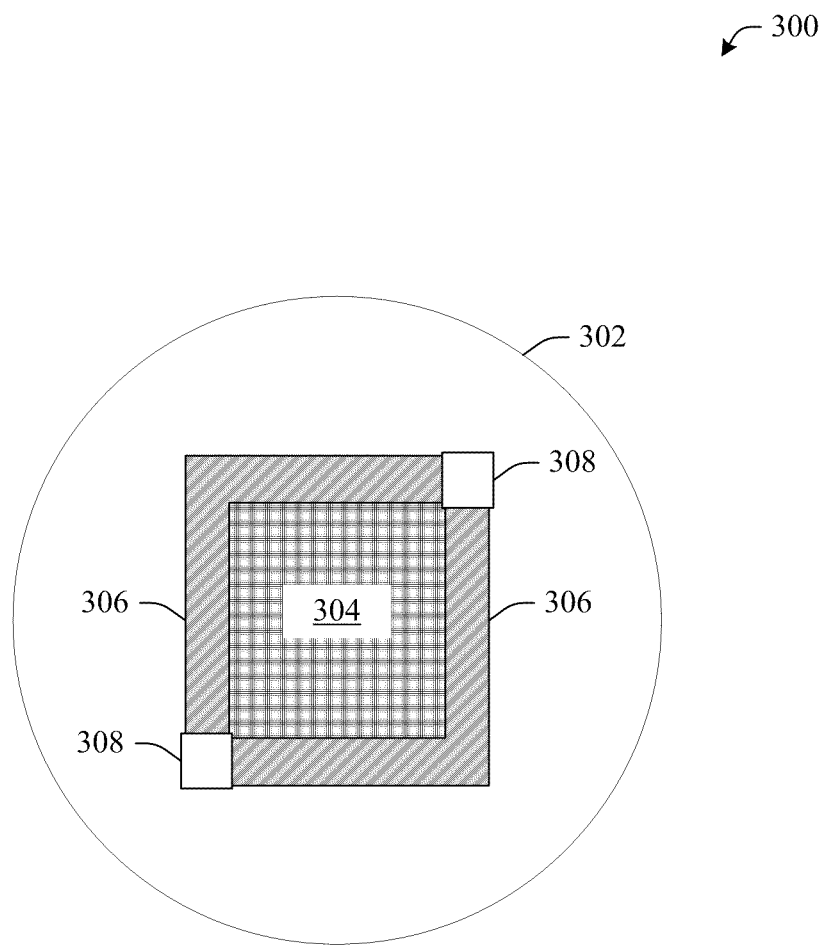
FIG. 3 illustrates an example top-down view of a self-heating temperature sensor system in accordance with aspects of the innovation.

FIG. 3 illustrates a top view of an example stabilization system 300 in accordance with aspects of the innovation. Generally, system 300 includes a protective cover 302 having a lens 304 (or window) provided on the top surface of the protective cover (302). In aspects, the window 304 is integral to the cover however, can also be a separate component in alternative designs. As described supra, the protective cover 302 encases components of an IR sensor system (e.g., system 100 of FIG. 1).

The temperature and temperature movement of the lens 304 (or window) is effectively noise to the IR detection of the system resulting in inaccurate readings. In accordance thereto, the innovation provides for temperature stabilization of the lens 304. Essentially, the lens 304 is an IR transmissive window 304 bordered by a metalized copper (Cu) frame 306. The frame 306 is deposited upon the inner surface of the protective cover 302 and can focus heat around the window 304. While a square frame is shown, it is to be understood that other shapes and deposits of conductive material (e.g., copper) that focus heat upon the window 304 can be employed without departing from the spirit and/or scope of the innovation. Additionally, other conductive metals, e.g., platinum, silver, etc. can be employed in alternative aspects. Self-heating resistive temperature sensors 308 (e.g., RTDs) can be provided so as to control the self-heating functionality of the innovation. It is to be understood that the RTDs 308 can detect and deliver thermal power as appropriate for temperature stabilization. While two RTDs are shown, other aspects can employ additional or fewer RTDs as appropriate without departing from the scope of this innovation and claims appended hereto.

Figure 4:
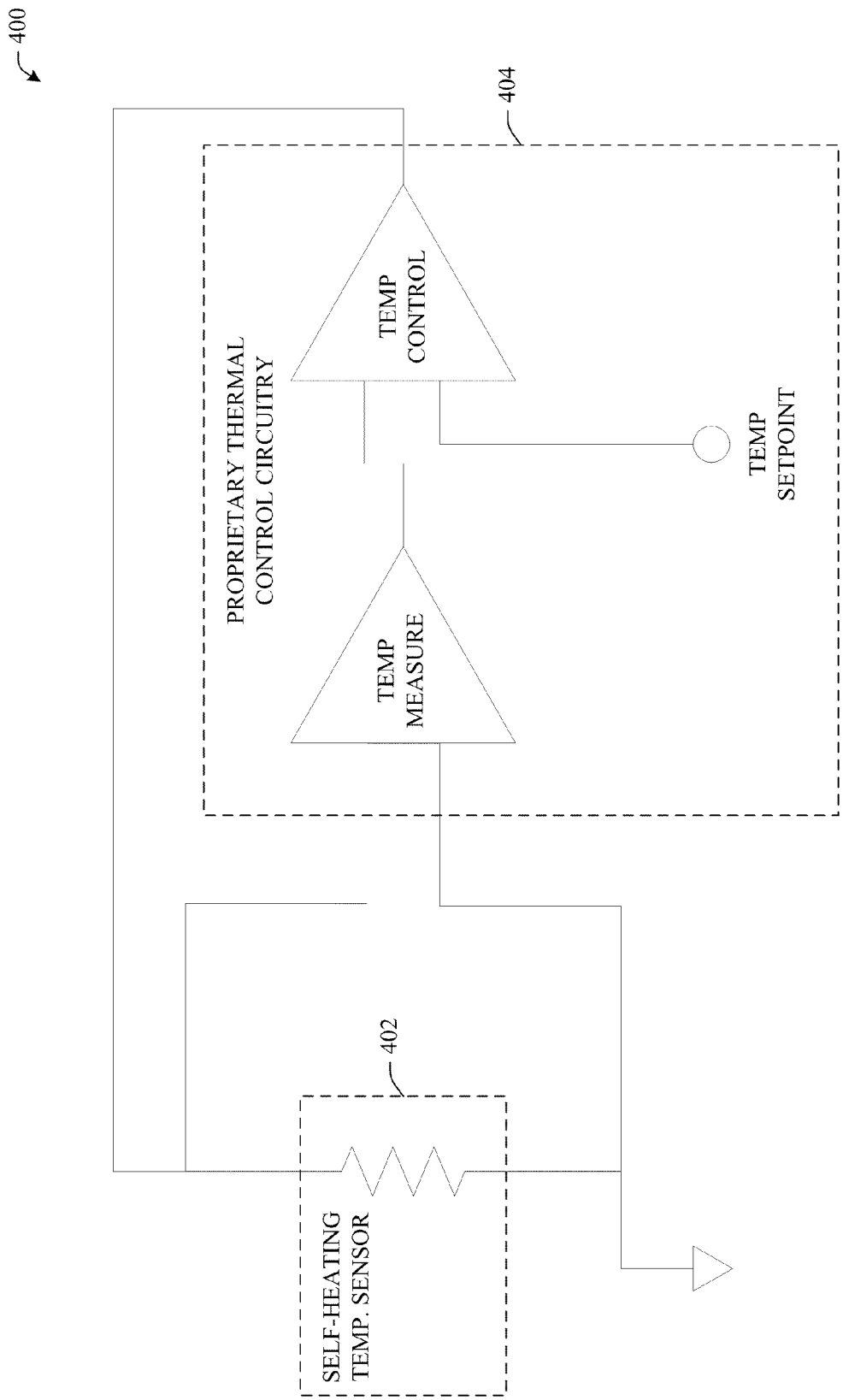
FIG. 4 illustrates an example electrical schematic of components and circuitry that facilitate temperature stabilization in accordance with aspects of the innovation.

FIG. 4 depicts an example electrical schematic 400 in accordance with aspects of the innovation. As shown, a self-heating temperature sensor 402 (e.g., RTD) can be electrically coupled to temperature measurement and temperature control components included within a thermal control circuitry 404. In accordance with a desired temperature setpoint, RTDs 402 can measure and control temperature by varying power dissipation. In other words, RTD 402 resistance will represent a certain temperature and the power provided to the RTD 402 will be proportional to the square root of the current passing through the RTD 402. In operation, a particular setpoint temperature can be selected (e.g., 120° F.), whereby the RTD can be provided with a requisite amount of power so as to achieve the desired temperature. Within the thermal control circuitry 404, the temperature can be measured as shown. In accordance with this measured temperature, the temperature control can provide enough power to the self-heating temperature sensor (RTD) 402 to achieve the temperature setpoint as desired.

Thus, the temperature control can vary the power based upon a present and/or desired temperature. Therefore, heat loss can be automatically or actively compensated for and stabilized in an active control of the thermal environment of the location(s) of the RTD(s). It is to be understood that this process of regulating temperature can also be utilized with regard to all RTDs provided within systems of the innovation, e.g., RTDs bonded to conductive metal within the protective housing as described below.

Figure 5:
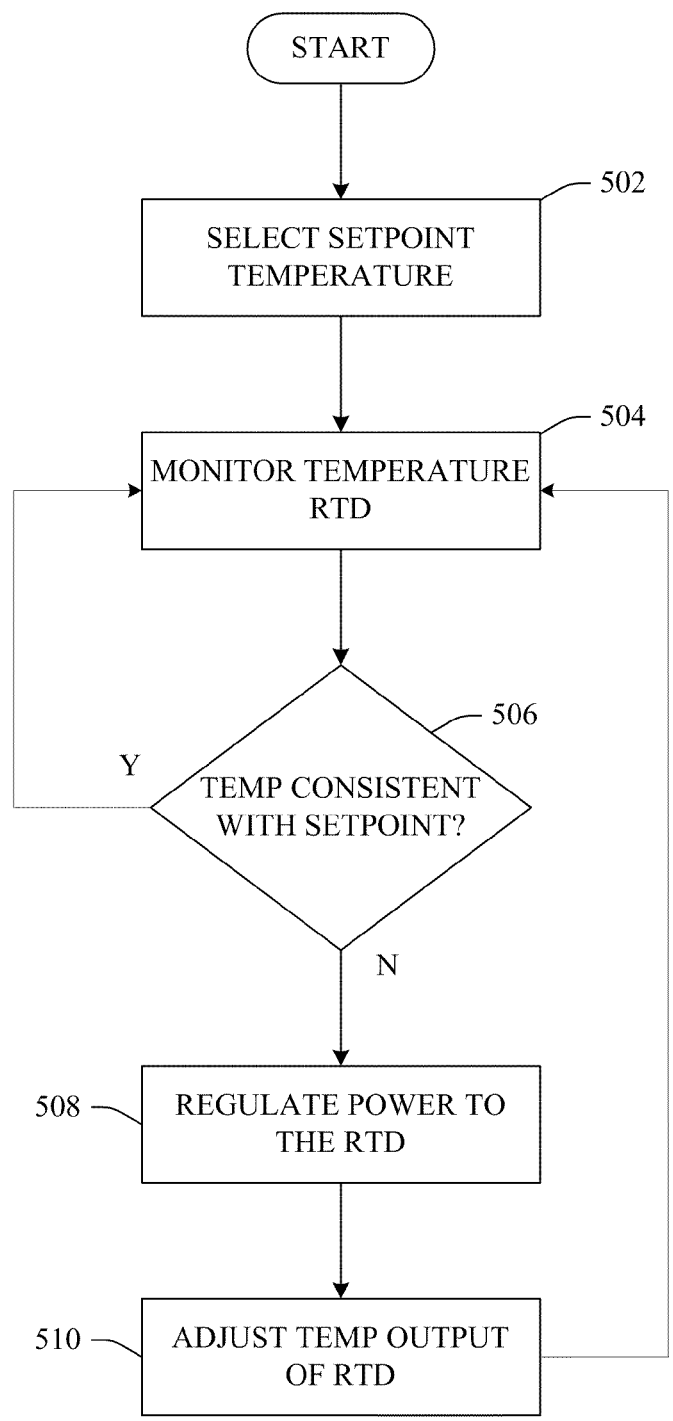
FIG. 5 illustrates an example flow chart of procedures that facilitate active temperature stabilization in accordance with an aspect of the innovation.

FIG. 5 illustrates a methodology of stabilizing components in an IR temperature measurement system in accordance with aspects of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 502, a temperature setpoint can be established. For example, a setpoint of 120° F. can be selected in aspects so as to exceed most any ambient operating conditions. As described above, an IR sensor assembly can be equipped with a number of RTDs so as to actively stabilize component temperatures. For example, a conductive frame can be equipped with RTDs so as to focus heat upon a transmissive window in a protective housing. Similarly, an RTD can be bonded to a baseplate of a thermopile and can provide temperature stabilization.

At 504, temperature can be monitored via the RTD. As will be understood, the RTDs employed in connection with the innovation can both monitor and deliver heat as desired. A decision is made at 506 to determine if the monitored temperature is consistent with the desired temperature setpoint. If yes, the methodology returns to 504 to monitor the temperature.

If not consistent at 506, power to the RTD can be regulated at 508. Thus, the temperature output of the RTD can be regulated (e.g., raised) at 510. As will be appreciated, the rise in temperature can effectively regulate and/or stabilize IR 'visible' components within the protective housing and within the IR measurement object-target path.

Figure 6:
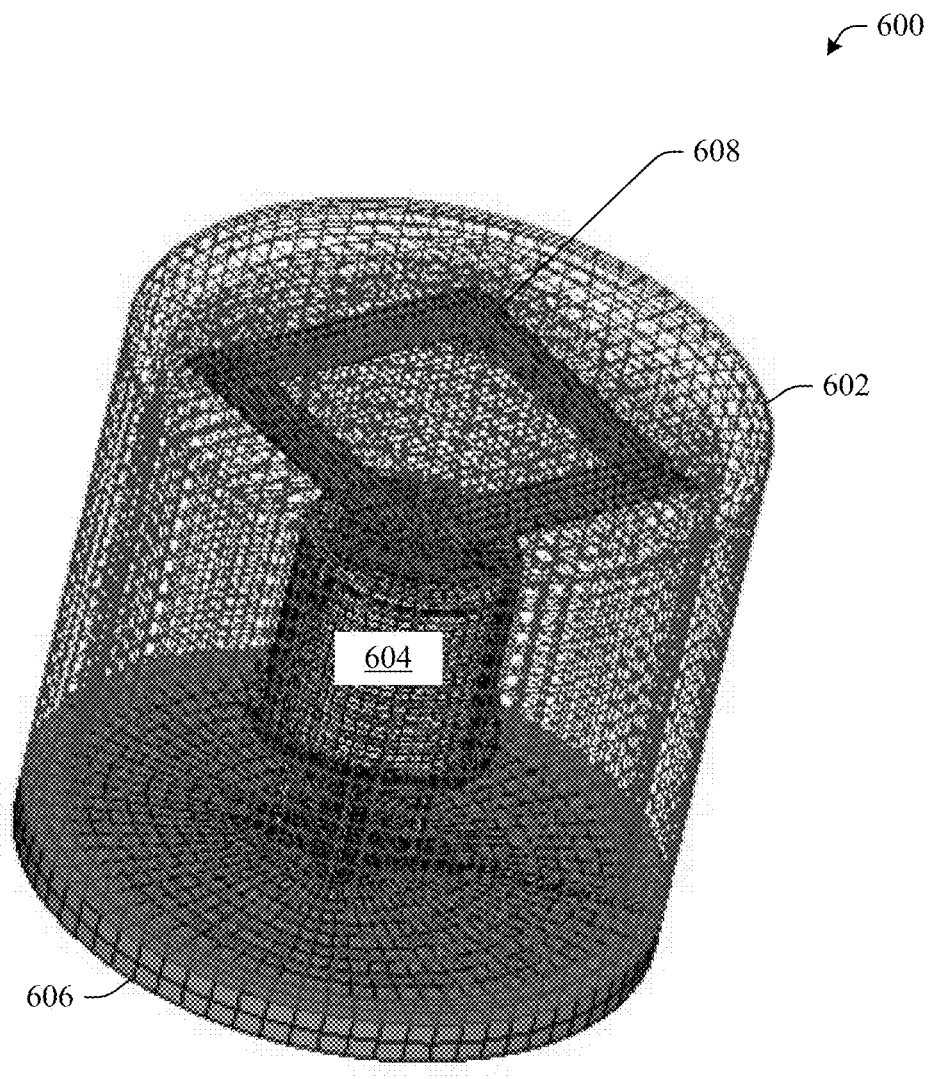
FIG. 6 illustrates an example self-heating temperature IR sensor assembly in accordance with aspects of the innovation.

Referring now to FIG. 6, illustrated is an example self-heating temperature sensor assembly 600 in accordance with the innovation. As shown in the example of FIG. 6, a protective housing 602 encases thermopile or sensor 604. For example, the protective housing 602 shelters, shields and/or safeguards the sensor 604 from environmental effects. A circuit board 606 is provided upon which sensor 604 can be mounted. It will be understood and appreciated that circuitry can be disposed upon the board so as to control the sensor 604 for temperature measurement and thermal stabilization control via RTDs as described herein. As illustrated, the circuit board 606 is of a shape consistent with the protective housing 602. A metalized frame 608 can be provided and equipped with RTDs that facilitate self-heating functionality of the innovation.

Figure 7:
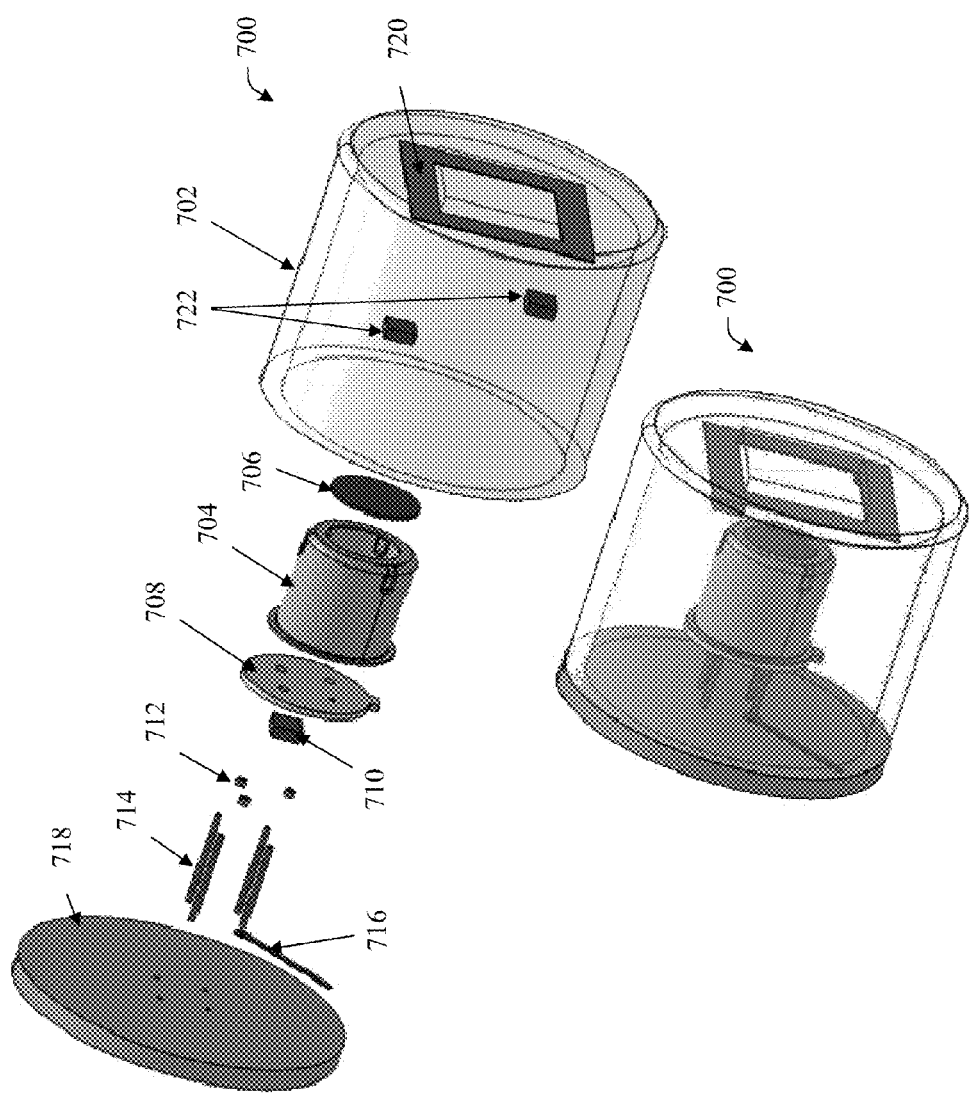
FIG. 7 illustrates an example exploded view of an example sensor assembly in accordance with aspects of the innovation.

FIG. 7 illustrates an exploded (and assembled) view of a sensor assembly 700 in accordance with the innovation. As illustrated, the assembly 700 can include a protective housing 702 that encases sensor components. In aspects, the protective housing can be manufactured of most any plastic or suitably rigid material.

The protective housing 702 shields a sensor housing 704, for example, from environmental effects. The sensor housing 704 can be manufactured of stainless steel or most any other suitably rigid material. As illustrated in FIG. 1 discussed supra, a sensor optic lens 706 can be fitted atop the sensor housing 704. The lens 706 is transparent and can be manufactured of silicon or other suitably transparent or translucent material.

A baseplate 708 is disposed upon an end of the sensor housing 704 opposite the lens 706. In aspects, the baseplate 708 is manufactured of stainless steel. However, it will be understood and appreciated that most any suitable material can be employed without departing from the spirit and/or scope of the innovation and claims appended hereto. A resistive temperature detector (RTD) 710 can be mounted or thermally bonded beneath the baseplate 708, thereby temperature stabilization of components (e.g., 708, 706, and 704) can be effected via RTD 710. In aspects, RTD 710 can be a ceramic RTD.

The RTDs of the innovation are capable of use in a mode that can measure temperature and deliver heat simultaneously. Thus, this single component (e.g., RTD) is capable of functionally measuring temperature while at the same time working to stabilize temperatures of other IR 'visible' components (e.g., housing, baseplate, optic lens, protective housing window, etc.). The RTDs can be controlled by a circuit that facilitates maintenance of a particular temperature or setpoint (e.g., 120° F.).

Accordingly, the circuitry can regulate power to the RTD to maintain the desired temperature. While specific temperatures and power sources are described herein, the features, functions and benefits of the innovation can be employed to maintain most any desired temperature by providing power or wattage as appropriate. It will be appreciated that stabilization of the critical component's temperature enhances accuracy and performance of the IR temperature sensing functionality.

As illustrated, glass fillers 712 can be fitted into holes of the baseplate 708. The glass fillers 712 can enhance the hermetic seal of the innovation in addition to the seal of the protective housing 702 mounted onto the circuit board 718. Upon manufacture, leads, e.g., copper leads, 714 can be inserted through the glass fillers 712 and into the baseplate 708. A trace, e.g., copper trace, 716 can be provided in embodiments. A circuit board 718 can be fitted onto the open end of the protective housing 702, thereby encasing sensor components therein. It will be appreciated that the circuit board 718 can be of a shape consistent with an open end of the protective housing 702. In other aspects, a groove that is consistent with the shape of the open end of protective housing 702 can be provided so as to provide a suitable hermetic seal.

Also included within the protective housing 702 is a metalized frame, e.g., copper frame, 720. The copper frame 720 can be equipped with RTDs 722. In one aspect, RTDs 722 are ceramic detectors. While RTD 710 can detect temperature and provide heat to the baseplate 708 region, the RTDs 722 can provide heat to the protective housing window region as shown. It will be appreciated that the RTDs 722 can provide heat to the metalized frame which can conduct heat around the window. By focusing heat upon the window, temperature can be evenly stabilized to enhance IR measurement functionality.

Figure 8:
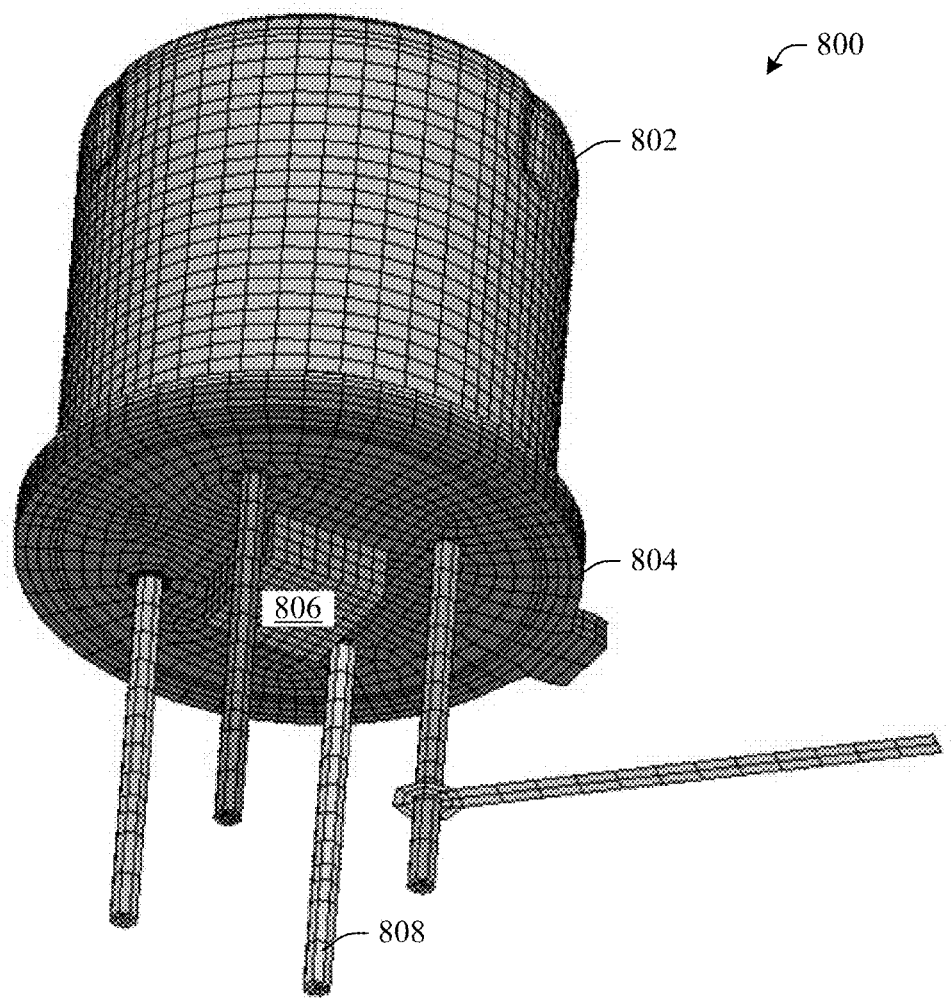
FIG. 8 illustrates an example bottom perspective view of an example sensor assembly in accordance with aspects of the innovation.

FIG. 8 is a bottom perspective view of an example sensor assembly 800 in accordance with aspects of the innovation. As shown, the sensor assembly 800 can include a protective housing 802, a circuit board 804 and an RTD 806. Additionally copper leads 808 are provided so as to facilitate electrical connection as appropriate.

Figure 9:
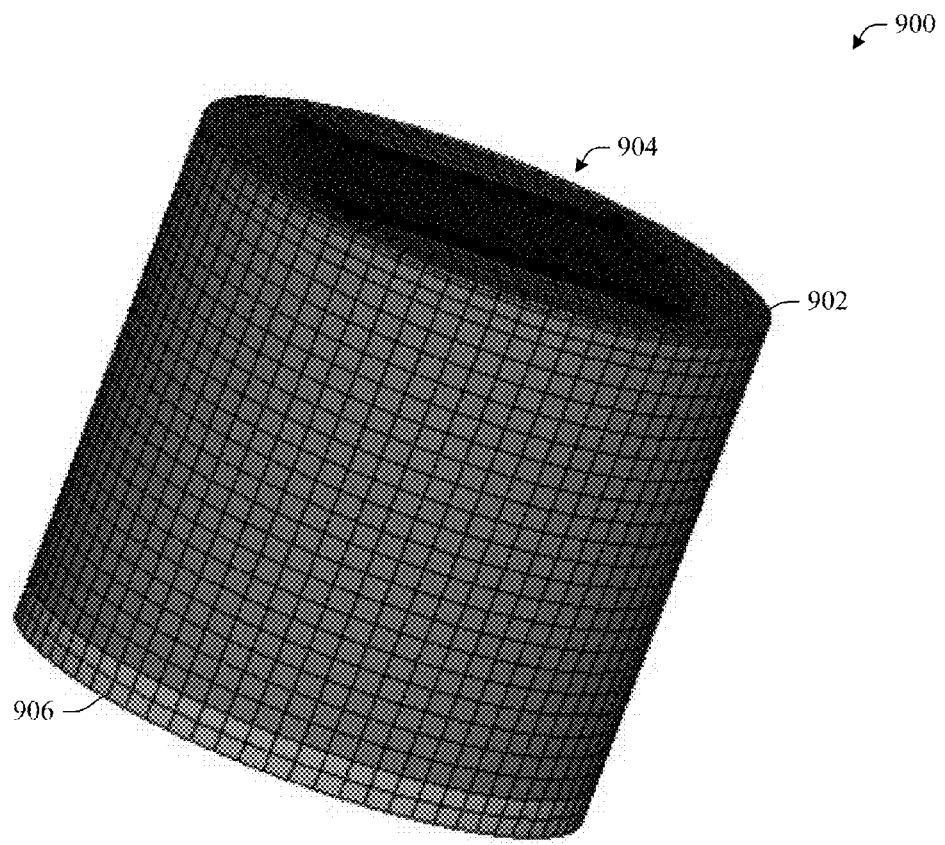
FIG. 9 illustrates an example side perspective view of an example sensor assembly in accordance with aspects of the innovation.

Referring now to FIG. 9, a side perspective view of an example sensor assembly 900 is shown. As illustrated, protective housing 902 can be equipped with a translucent window 904 on the top such that IR energy can be captured via a sensor or thermopile. The bottom section of the protective housing 902 is open such that sensor components can be inserted as described with regard to FIG. 7 supra. Further, the open end of the protective housing 902 can be configured to mate to a circuit board 906, e.g., providing a waterproof or hermetic seal. It will be understood that, where appropriate, gaskets can be provided to assist with or enhance the sealing functionality.

Figure 10:
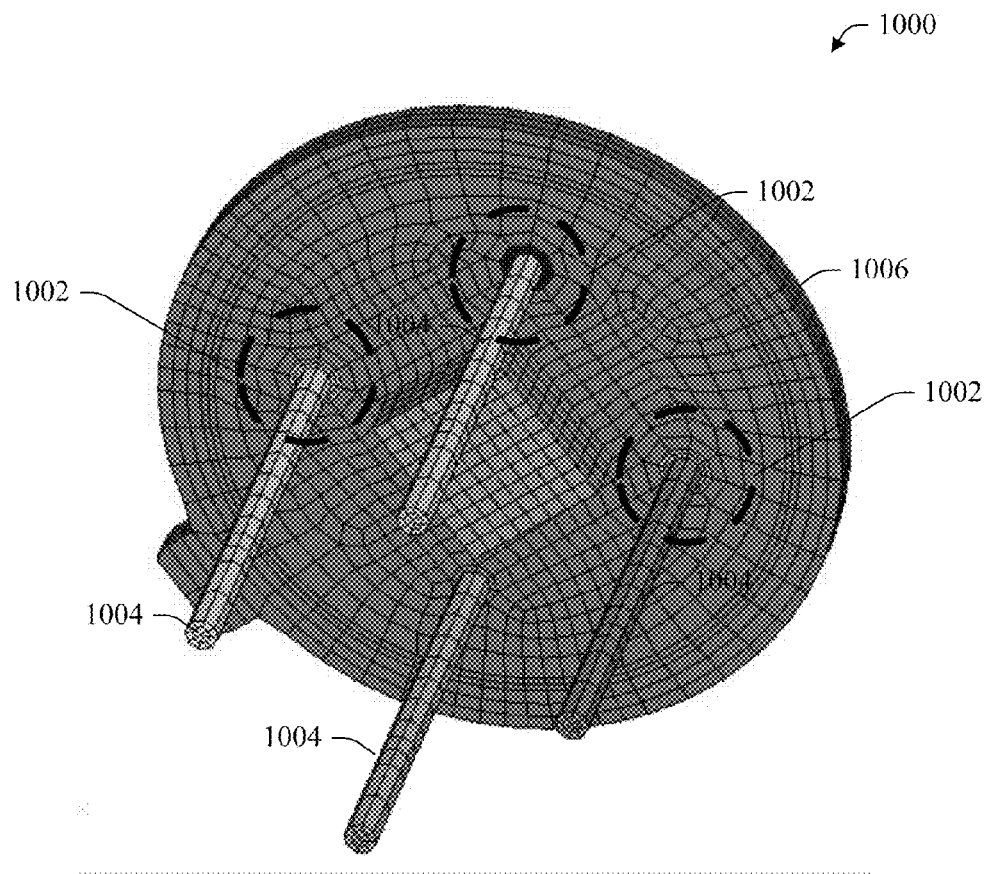
FIG. 10 illustrates an example bottom-up perspective view of an example sensor assembly in accordance with aspects of the innovation.

FIG. 10 illustrates a bottom-up perspective view of an example sensor assembly 1000 in accordance with aspects. From this vantage point, placement of glass fillers 1002 can be can be seen. In other words, each of the leads 1004 is passed through a glass filler 1004 upon insertion into the circuit board 1006.

Figure 11:
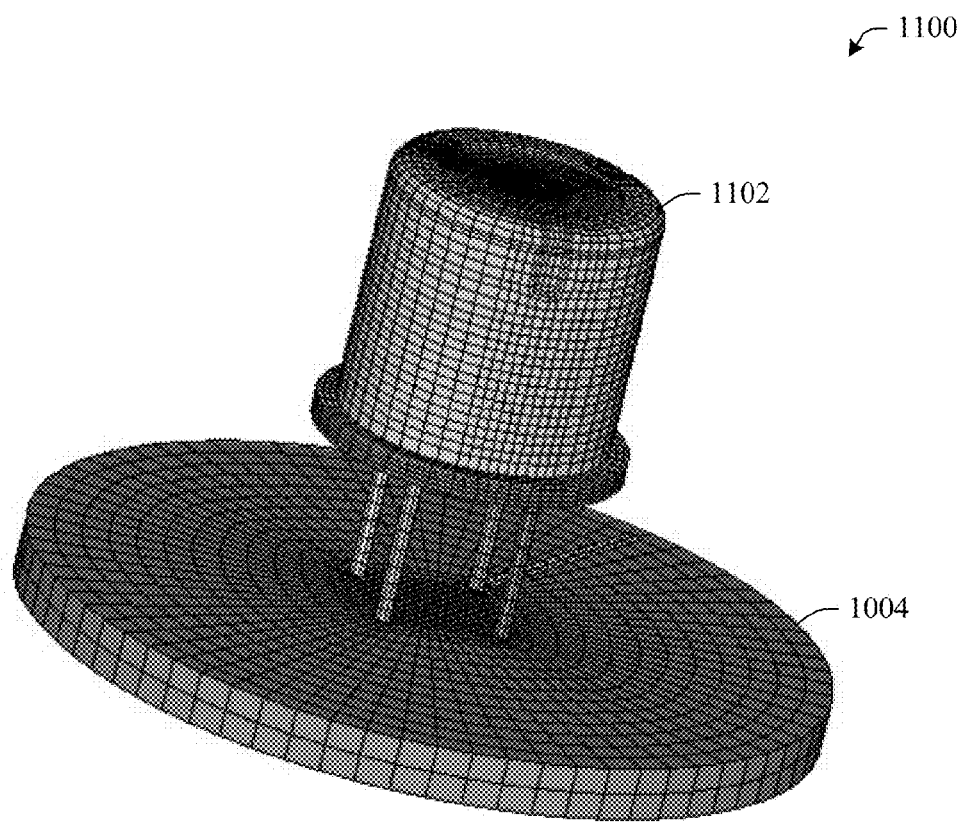
FIG. 11 illustrates yet another example perspective view of an assembly in accordance with aspects of the innovation.

FIG. 11 is yet another perspective view of an assembly 1100 in accordance with aspects. As shown, a sensor component 1102 can be disposed within the center of circuit board 1104. In other aspects, the sensor component 1102 can be mounted upon an end cap that does not include circuitry. In these alternative aspects, the circuitry can be remotely located from the thermopile. It is to be appreciated that this illustration is exemplary and not intended to limit alternative aspects of the innovation.

Figure 12:
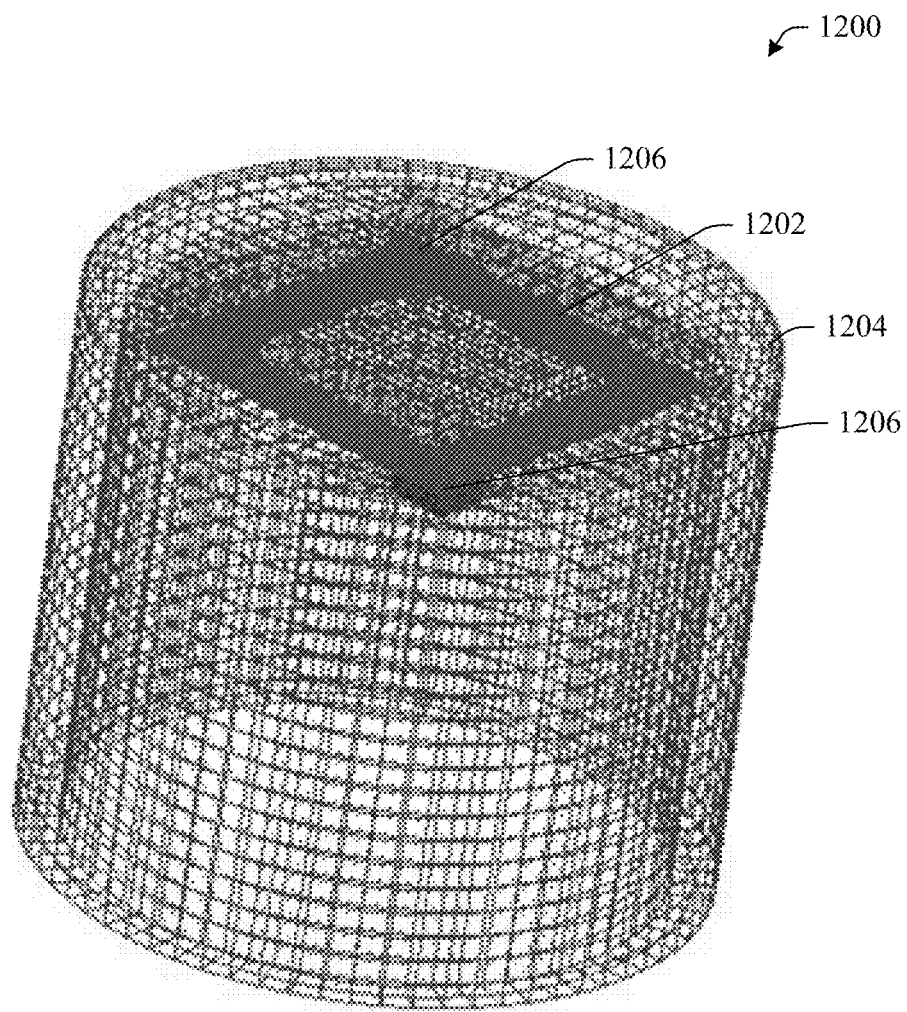
FIG. 12 illustrates an example placement of a conductive copper frame in accordance with aspects of the innovation.

FIG. 12 illustrates an example placement of a copper frame 1202 within the closed face of protective housing 1204. In other words, the metal, e.g., copper, frame 1202 is encased within the protective housing 1204 together with other sensor components as described in greater detail supra. Further, the metal frame 1202 can be equipped with RTDs 1206 as shown. These RTDs 1206 can provide information necessary for temperature stabilization in accordance with the features, functions and benefits of the innovation. As well, the RTDs 1206 can provide heat as necessary for stabilization effect.

FIGS. 13 to 16 are shown in accordance with a specific aspect of the innovation. While specific heat capacities and conductivities are disclosed, it is to be understood that these values and parameters are provided for perspective and not to limit the innovation in any manner.

Figure 13:
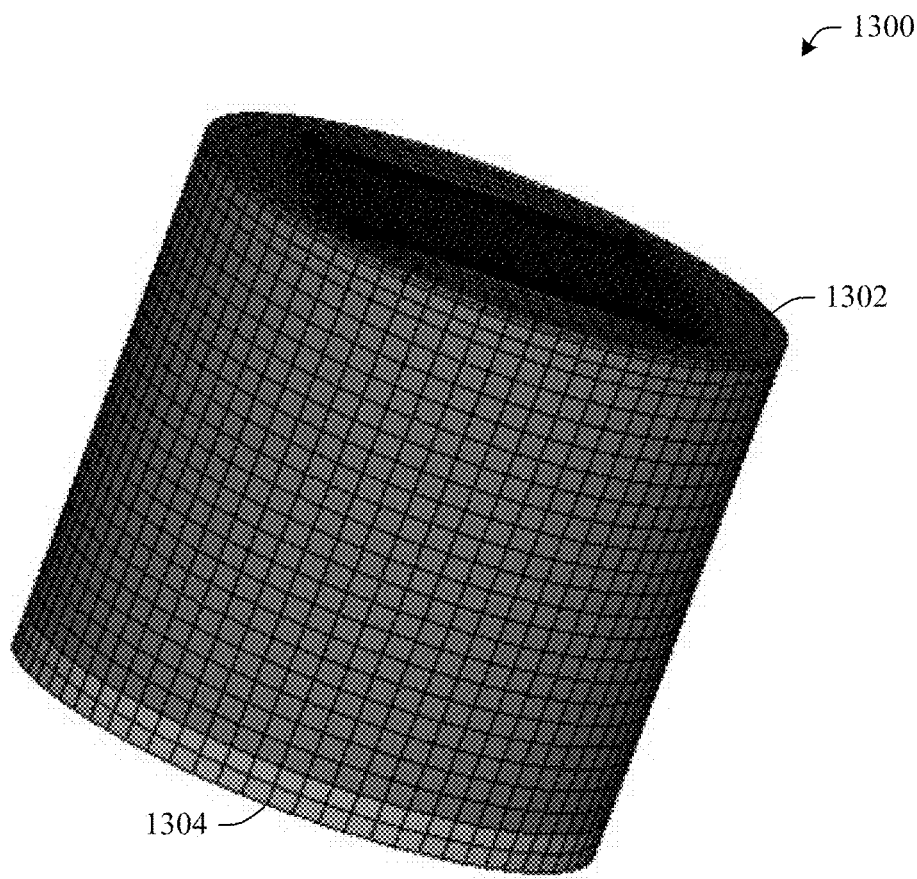
FIG. 13 illustrates an example side perspective view of a protective housing and circuit board base in accordance with aspects of the innovation.

Referring first to the assembly 1300 of FIG. 13, protective housing 1302, e.g., plastic, can have a specific heat capacity of 2200 J/Kg ° K and a conductivity of 0.5 W/m ° K. Circuit board 1304 can have a specific heat capacity of 1200 J/Kg ° K and a conductivity of 0.23 W/m ° K.

Figure 14:
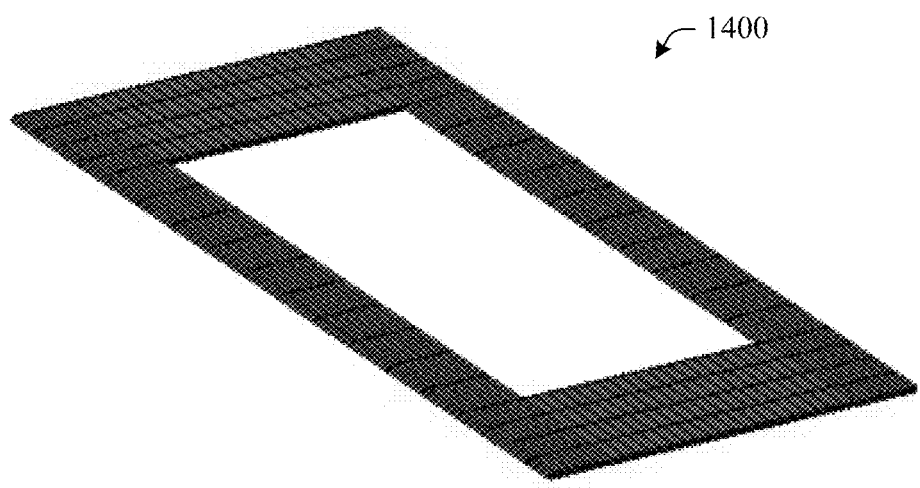
FIG. 14 illustrates an example conductive copper frame in accordance with aspects of the innovation.
Figure 15:
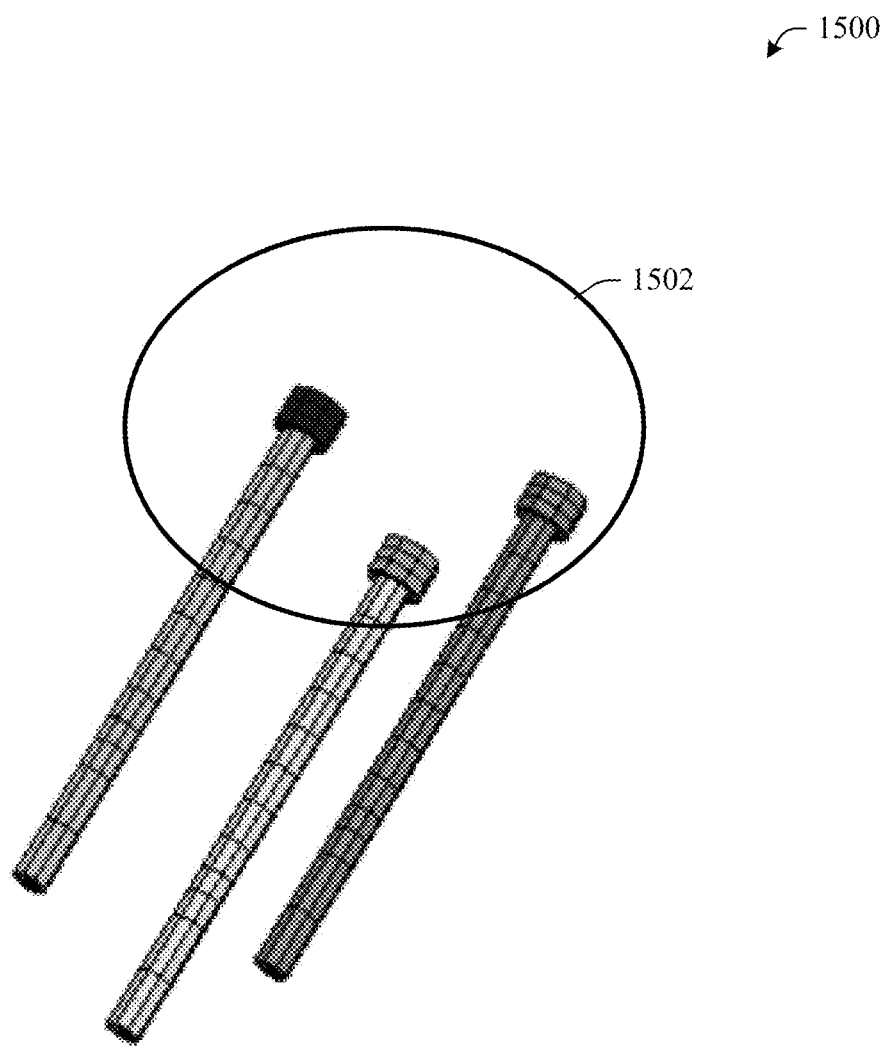
FIG. 15 illustrates glass fillers positioned onto leads in accordance with aspects of the innovation.

The copper frame 1400 of FIG. 14 can have a specific heat capacity of 385 J/Kg ° K and a conductivity of 398 W/m ° K. The glass fillers 1502 of FIG. 15 can have a conductivity of 0.836 W/m ° K.

Figure 16:
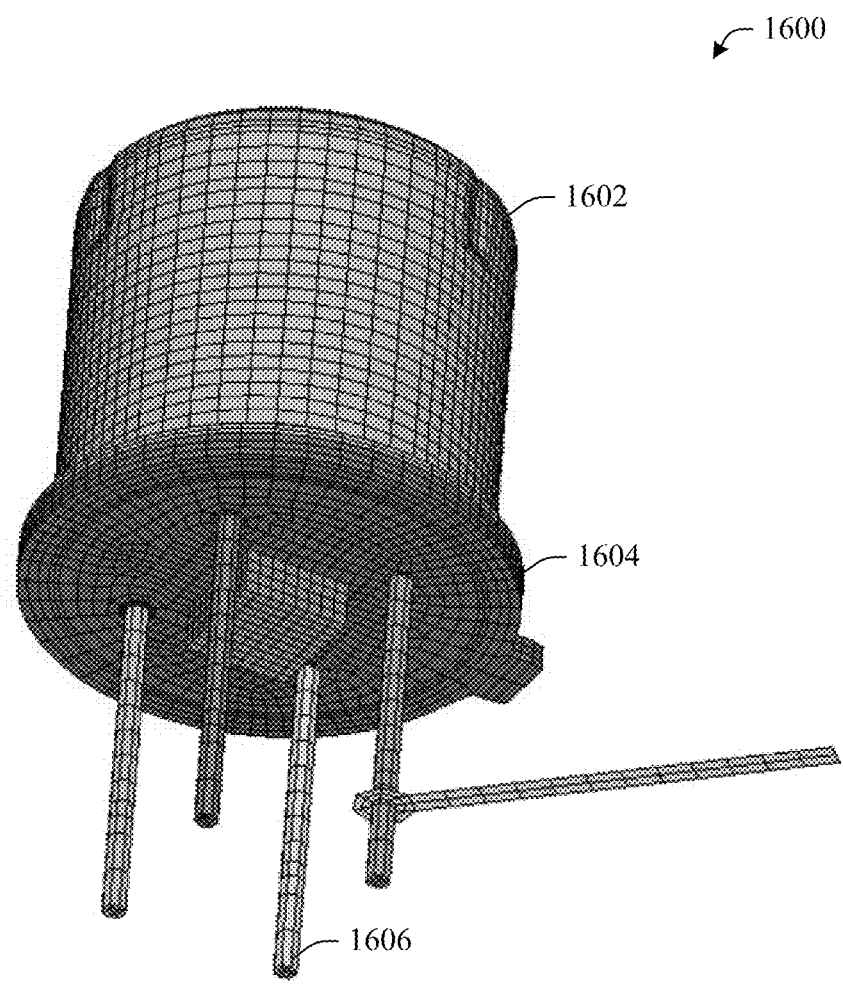
FIG. 16 is an example bottom-up perspective view of an assembly in accordance with aspects of the innovation.

Finally, as shown in FIG. 16, a sensor housing 1602, e.g., steel housing, can have a specific heat capacity of 477 J/Kg ° K. The sensor housing 1602 can also have a conductivity of 16.7 W/m ° K in aspects. Consistent with the sensor housing 1602, the baseplate 1604, e.g., steel, can have a specific heat capacity of 477 J/Kg ° K and a conductivity of 16.7 W/m ° K. The leads 1606, e.g., copper leads, can have a specific heat capacity of 385 J/Kg ° K and a conductivity of 398 W/m ° K.

In accordance with the innovation, it is to be understood that heat transfer is a through conduction in a component and wherever two components come into contact. The outer surface of the protective housing can convect with the ambient temperature. The inner surface of the protective housing and the outer surface of the other components within the protective housing (e.g., sensor housing) will convect with the captive air that is trapped inside the protective housing. In embodiments, convective heat transfer coefficient of 7.9 W/M^2 K is used.

In accordance with the aforementioned heat capacities and conductivities, a power source of 0.196 W was specified at each RTD. The ambient temperature was fixed as −20° C. Upon testing, a power source of 0.196 W was applied at each RTD. The RTDs at the copper frame to reached a temperature of about 120° F. The temperature at RTD near the baseplate for this power is 101° F. It will be understood that this amount of stabilization is sufficient to enable efficient and accurate IR temperature measurements. In other words, control circuitry can be provided so as to use the stabilized component temperatures in IR energy to temperature conversions. As a result, effects of IR 'visible' components are alleviated.

While active stabilization has been disclosed and described in detail herein, it is to be understood that passive (or combinations of active and passive) stabilization embodiments are to be contemplated and included within the scope of the disclosure and claims appended hereto. For instance, in a passive embodiment, the sensor component(s) may be thermally coupled to the optics so as to effect passive stabilization. In other words, the cover (e.g., including optics) can be metalized using a conductive material (e.g., copper). Here, the passive conductivity of thermal properties via the conductive metal can be used to stabilize the temperature(s) as described herein.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An infrared (IR) temperature monitoring system, comprising:
    a protective housing having an open end and closed end;
    an IR temperature sensor having a sensor housing which encases an IR element, wherein the protective housing encases the IR temperature sensor and the sensor housing, wherein the protective housing is a plastic cap that shields the sensor housing from one or more environmental effects;
    a metallic frame positioned upon an inner portion of the closed end of the protective housing, wherein the metallic frame encompasses a transmissive window in the closed end of the protective housing, wherein the metallic frame provides a stable temperature around the transmissive window;
    a plurality of resistive temperature detectors (RTDs) thermally bonded to the metallic frame, wherein the plurality of RTDs both detect and generate heat and actively stabilize a temperature of the transmissive window; and
    a control circuitry that actively stabilizes temperature of the transmissive window via temperature control of each of the plurality of RTDs to maintain a setpoint temperature via one or more of the RTDs by regulating current and power dissipation to the plurality of RTDs while measuring the temperature measurement.

2. The system of claim 1, further comprising an additional RTD thermally bonded to a baseplate of the IR element, wherein heat generation via the additional RTD is actively controlled via the control circuitry, and wherein the heat generation actively stabilizes temperature of the baseplate.

3. The system of claim 1, wherein the IR sensing element is positioned onto a circuit board, wherein the circuit board hermetically seals to the open end of the protective housing.

4. The system of claim 1, wherein the control circuitry produces substantially 200 mW and stabilizes the temperature at substantially 120° F.

5. The system of claim 1, wherein the control circuitry actively stabilizes temperature of the metallic frame, the plurality of RTDs and the IR temperature sensing element.

6. The system of claim 1, wherein the protective housing is cylindrical in shape.

7. The system of claim 1, wherein the protective housing is plastic.

8. The system of claim 1, wherein the metallic frame is a copper frame.

9. The system of claim 1, wherein the IR temperature sensing element comprises a housing with plastic that acts as a lens arranged at one end of the sensing element and a baseplate mounted to the other end of the sensing element, wherein the baseplate includes an additional RTD that stabilizes temperature of each of the IR sensor components via the control circuitry.

10. The system of claim 1, wherein the optical lens is a thermally stable lens.

11. The system of claim 1, further comprising glass fillers that hermetically seal each lead that traverses through the baseplate of the IR temperature sensing element.

12. The system of claim 1, further comprising a temperature channeling means that directs heat from the metallic frame to a baseplate of the IR temperature sensing element.

13. The system of claim 1, wherein each of the RTDs is a ceramic RTD.

14. A method for stabilizing temperature of an IR temperature sensing assembly, comprising:
    selecting a setpoint temperature;
    monitoring a present temperature of a plurality of RTDs in relation to the setpoint temperature;
    encasing a sensor housing of an IR sensing element with a protective housing that shields the sensor housing from one or more environmental effects;
    stabilizing a temperature of a transmissive window by applying heat on the transmissive window of the protective housing; and if the present temperature of one of the plurality of RTDs is not consistent with the setpoint,
actively regulating power to the one of the plurality of RTDs; and
adjusting the heat output of the one of the plurality of RTDs as a function of the present temperature related to the setpoint.

15. The method of claim 14, further comprising:
depositing or fitting a metallic frame around the transmissive window of the protective housing; and
thermally bonding the plurality of RTDs to the metallic frame.

16. The method of claim 15, further comprising thermally bonding an additional RTD to a baseplate of an IR temperature sensing element.

17. The method of claim 15, further comprising channeling heat from the metallic frame to an optic lens of an IR temperature sensing element.

18. An infrared (IR) temperature monitoring system, comprising:
a protective housing having an open end and closed end;
an IR temperature sensor having a sensor housing which encases an IR temperature sensing element, wherein the protective housing encases the IR temperature sensing element and the sensor housing, wherein the protective housing is a cap that shields the sensor housing from one or more environmental effects;
a metallic frame positioned upon an inner portion of the closed end of the protective housing, wherein the metallic frame encompasses a transmissive window in the closed end of the protective housing, wherein the metallic frame provides a stable temperature around the transmissive window;
a plurality of resistive temperature detectors (RTDs) thermally bonded to the sensor housing, wherein the plurality of RTDs detect and generate heat, wherein the metallic frame conducts heat to passively and actively stabilize one or more components bonded thereto and a temperature of the transmissive window; and
a control circuitry that actively stabilizes temperature of the transmissive window via temperature control of each of the plurality of RTDs to maintain a setpoint temperature via one or more of the RTDs by regulating current and power dissipation to the plurality of RTDs while measuring the temperature measurement.

19. The system of claim 18, wherein the protective housing is made of plastic.

20. The system of claim 18, wherein the protective housing comprises an integral lens having the same material as the protective housing.

* * * * *